D. MARSH.
BOLTER AND RIDDLER.
No. 8,970. Patented May 25, 1852.
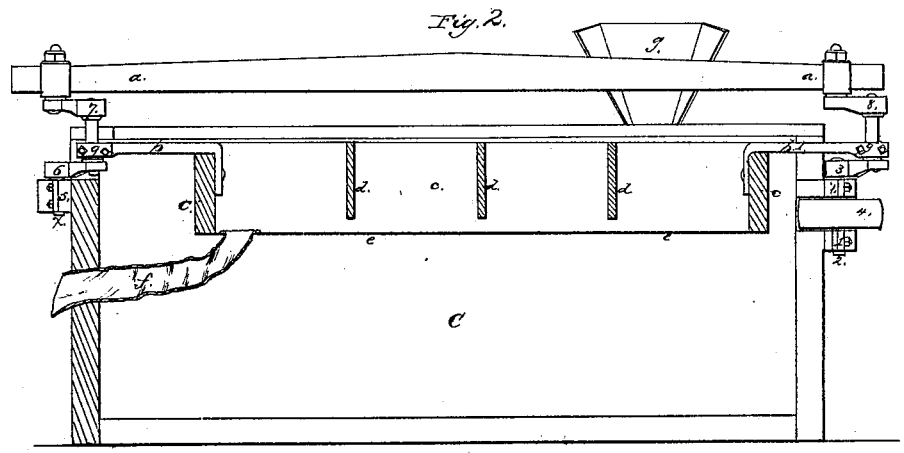
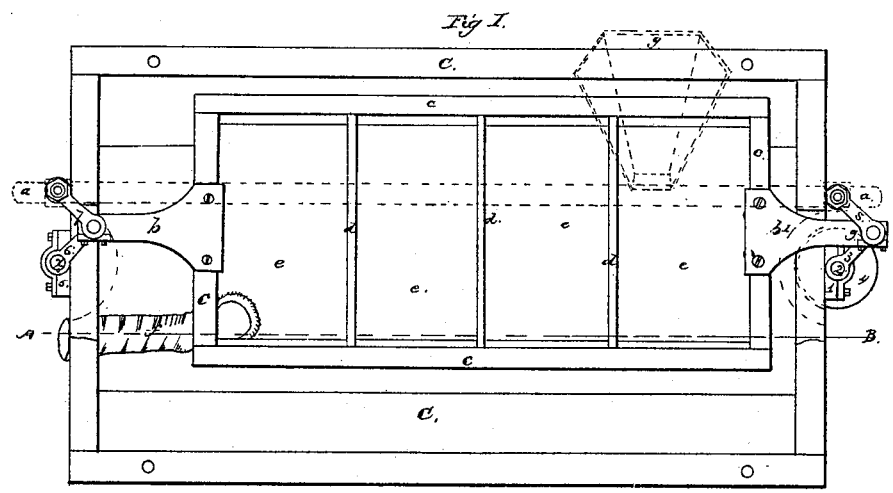
Witnesses
Inventor
David Marsh

UNITED STATES PATENT OFFICE.

DAVID MARSH, OF FAIRFIELD, CONNECTICUT.

FLOUR-BOLT.

Specification of Letters Patent No. 8,970, dated May 25, 1852.

*To all whom it may concern:*

Be it known that I, DAVID MARSH, of Fairfield, Fairfield county, State of Connecticut, millwright and machinist, have invented, made, and applied to use certain new and useful improvements in the means of bolting or riddling the meal of grain or other vegetable substances or of separating other comminuted materials so as to divide the finer from the coarser particles, for which improvements I seek Letters Patent of the United States; and that the said improvements are fully and substantially set forth and shown in the following description and in the drawing annexed to and making part of this specification, wherein—

Figure 1, is a plan with the cover and connecting bar removed the latter being shown by dotted lines, Fig. 2, is a longitudinal section through the line A, B, of Fig. 1; the like marks of reference apply to the same parts in each figure.

C, is a box or other receptacle to receive the finer portions of the material under treatment.

1, 1, are bracket journals carrying a shaft 2, having a crank 3, on the upper end, and between the journals 1, 1, is a driving pulley 4, to receive a belt to any power competent to give a quick motion to the parts or the shaft may be extended either upward or downward to receive this pulley or be otherwise connected to the power.

5, is a bracket journal at the other end of the box C, carrying a shaft $x$, with a second crank 6, and on the crank pins of the cranks 3 and 6, are third and fourth cranks 7 and 8, keyed or otherwise secured. The pins of these cranks are connected by a bar $a$, and the cranks 7 and 8, are at right angles to the cranks 3, and 6, as shown in the plan Fig. 1. Around the pins of the cranks 3 and 6, are journal boxes 9 on flanches $b$, $b$, $l$, the ends of which are connected to the bolter box $c$. This has divisions $d$, across it which do not touch the bolting cloth or sieve $e$; a flexible tube $f$, is connected to one corner of the cloth or sieve $e$, to connect the coarser portions of the material outside the box C, and a hopper $g$, shown as behind in Fig. 2, supplies the substance to be operated on into the opposite end of the bolter box $c$.

The operation is as follows. Power being applied to drive the pulley 4, the shaft 2, and crank 3, is rotated and this carries the bolting box $c$, with a similar motion the other end following with the crank 6, but if only fitted with these two cranks, when the cranks 3 and 6, come in line with each other they would be liable to stick but by attaching the two cranks 7 and 8, at right angles to the cranks 3 and 6, and connecting them with the bar $a$, there is no "dead center" point so that the shaft $x$, and crank 6, must move with the shaft 2, and crank 3. The circular motion thus given equally to all parts of the bolter $c$, is similar to using a sieve by hand and effects a more perfect separation of the particles and also operates with rapidity the coarser and lighter particles always shaking to the top and working off by the tube $f$, the divisions $d$, operating as breakers or spreaders preventing the material working off too fast and spreading it evenly over the sieve $e$.

It will be evident that if the shafts 2 and $x$, are prolonged downward below the bottom of the bolter box and fitted with cranks, similarly to the cranks 7 and 8, and a connecting bar—and without the cranks 7 and 8 above—the same motion and results will be obtained. Or if the shafts 2 and $x$, are prolonged either upward or downward to receive pulleys connected by a belt or chain the like effects will be produced: viz., the cranks 3 and 6, will be equally and regularly rotated carrying with them the bolter $c$. And these are mere mechanical variations which may be necessary to suit the particular place in which the bolter is to be used.

I do not claim to be the first to use a flat sieve or boiler to separate substances of different sizes but What I do claim as new and of my own invention and desire to secure by Letters Patent of the United States is—

1. The construction arrangement and combination of the shafts and cranks 3 and 6, to receive and move the bolter $c$, with the cranks 7 and 8, and connecting bar $a$, or their equivalents as described to regulate and equalize the movement, the coarser particles being carried off from the bolter $c$, by the flexible tube $f$, or other convenient means the whole being substantially as described and shown.

2. And I claim the application of the breakers or spreaders $d$, in the bolting box $c$, to prevent the material working off too fast and spread it evenly over the sieve or bolter $e$, as described and shown.

In witness whereof I have hereunto signed my name this eleventh day of September one thousand eight hundred and fifty.

DAVID MARSH.

Witnesses:
WM. TERRELL,
LEMUEL W. TERRELL.